3,093,203
CONTAINER FILLING APPARATUS
Elmer F. Frost, Jr., Lakeland, Fla., assignor to FMC Corporation, a corporation of Delaware
Filed July 24, 1958, Ser. No. 750,732
9 Claims. (Cl. 177—120)

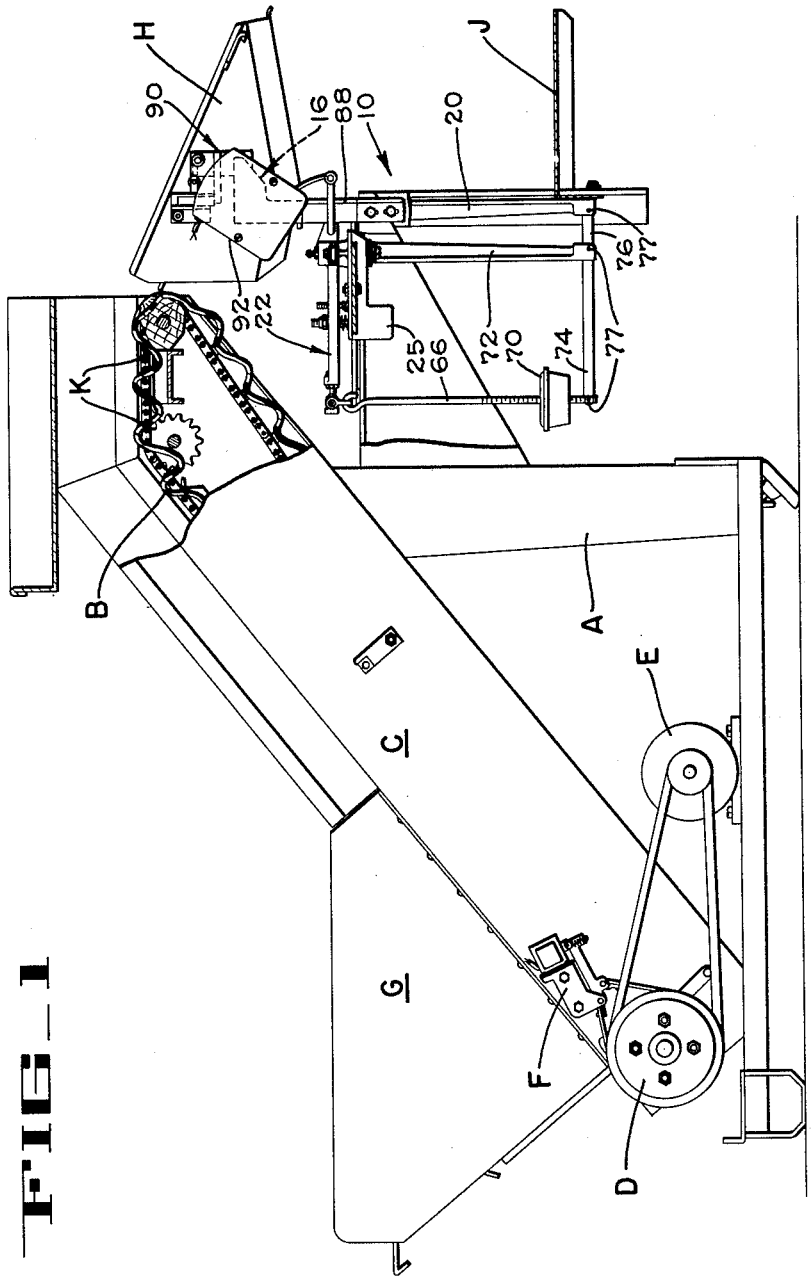
INVENTOR
ELMER F. FROST, JR.

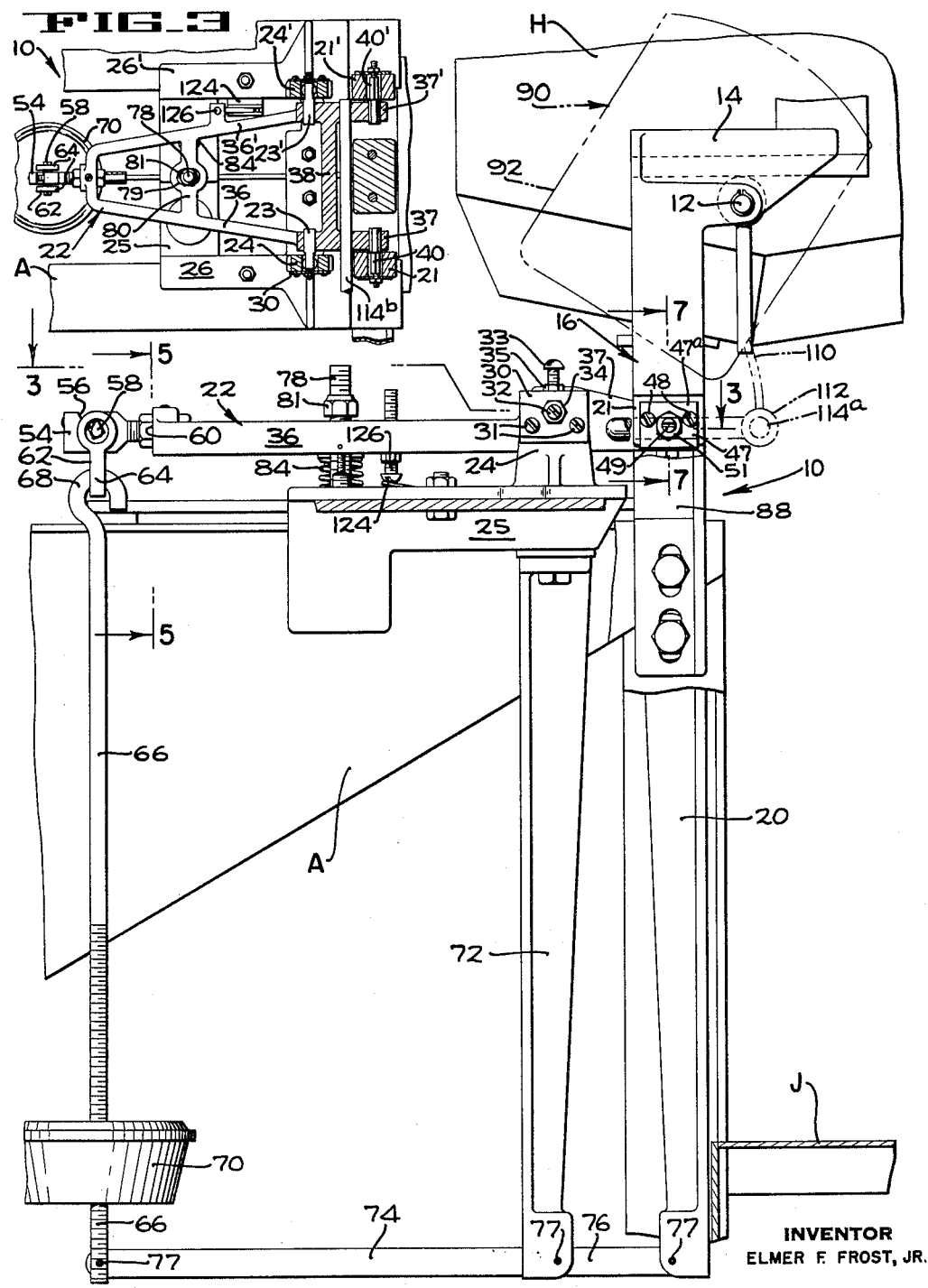

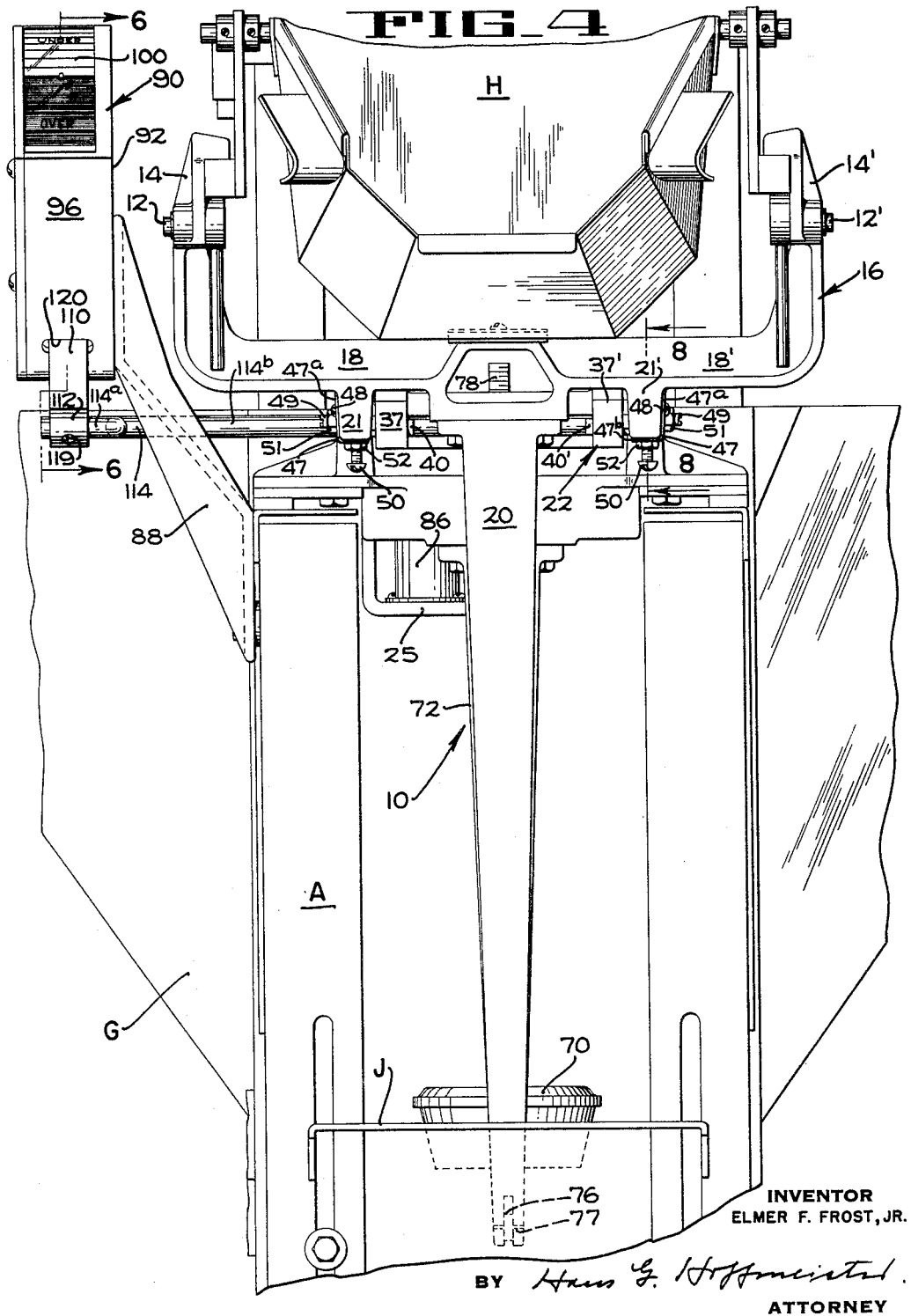

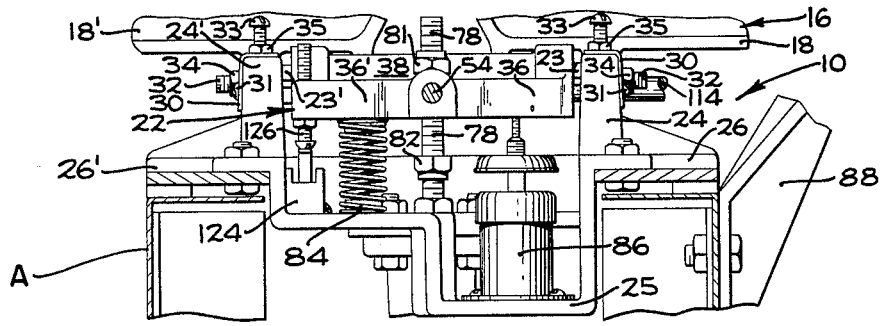
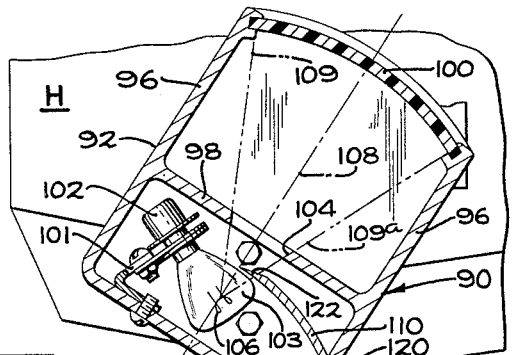
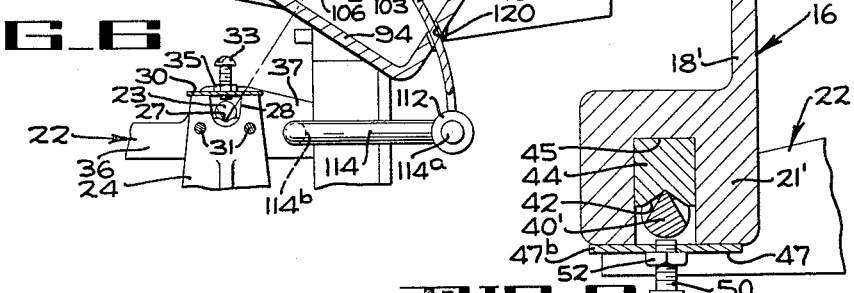
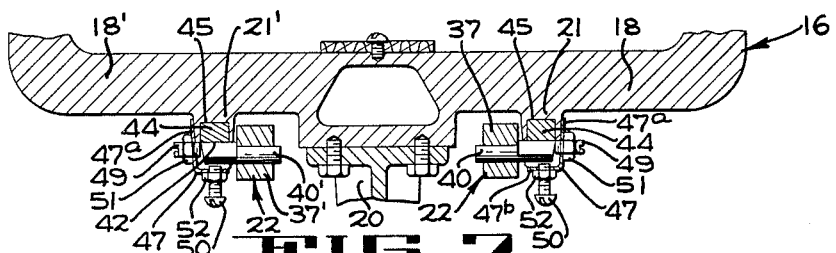

The present invention relates to apparatus for filling containers, such as bags, and more particularly to a beam type weighing scale for such apparatus.

The beam type scales presently being used in container filling machines have been unsatisfactory due to the fact that, when the weight of material being directed into the container reaches the desired value, the beam suddenly pivots toward the position of balance, and then is maintained in the balance position in a condition of unstable equilibrium. Such a condition makes the reading of the weight indicator difficult and unreliable. Further, it has been found that the usual type of weight indicator, which has a curved dial, cannot be easily read under all light conditions, such as when rays from the sun strike the dial at certain angles.

It is an object of the invention to provide an improved apparatus for filling containers.

Another object of the present invention is to provide an efficient weighing scale for container filling apparatus.

Another object is to provide a beam type weighing scale having an improved weight-indicating means.

Another object of the invention is to provide a weighing scale particularly suited for repeated weighing operations performed in conjunction with material handling apparatus, such as, for example, a bag filling machine.

Another object is to provide a scale having a beam that moves slowly to a position of balance and is maintained in a stable condition at the balance position.

Another object of the invention is to provide a weight indicator that can be read easily under all light conditions.

These and other objects and advantages of the present invention will become apparent from the following description thereof, read in conjunction with the accompanying drawings, in which:

FIG. 1 is a side elevation of bag filling apparatus incorporating the present invention, parts being broken away and a portion of the support frame being shown in section.

FIG. 2 is an enlarged side elevation of the forward portion of the apparatus of FIG. 1, parts being broken away, and the weight indicating device of the invention being shown in phantom.

FIG. 3 is a reduced horizontal section taken on line 3—3 of FIG. 2.

FIG. 4 is a fragmentary front elevation of the apparatus shown in FIG. 1.

FIG. 5 is a vertical section taken along the lines 5—5 of FIG. 2.

FIG. 6 is a vertical section taken along the lines 6—6 of FIG. 4.

FIG. 7 is a vertical section taken along the lines 7—7 of FIG. 2.

FIG. 8 is a vertical section taken along the lines 8—8 of FIG. 4.

Referring particularly to FIGURE 1, the weighing scale 10 of the present invention is shown mounted for use in conjunction with apparatus for filling containers with material, such as apples and the like, the apparatus being of the type disclosed in the copending application of W. C. Belk for "Article Handling Apparatus," Serial No. 666,018 which is assigned to the assignee of the present application. This apparatus comprises a support frame A; an endless chain type conveyor B; a housing C for said conveyor; a drive mechanism D for the conveyor; a motor E for said drive mechanism; a braking unit F; a storage bin G for feeding the material to be handled to the conveyor B; and a receptacle in the form of a hopper H for receiving the material from the conveyor and filling it into containers, such as bags (not shown), placed in succession upon a loading platform J. The conveyor B is formed with pockets, as seen at K, which are adapted to be filled with material from the storage bin G, and to transport this material to the hopper H. Inasmuch as these basic elements of the apparatus are fully described in the aforementioned Belk application, they will not here be described in detail, except to the extent necessary for an understanding of the present invention.

The weighing scale 10 and hopper H are so arranged that the latter will discharge a predetermined weight of material into a container on the platform J. As may best be seen in FIGURE 4, the hopper H is pivotally mounted by pins 12 and 12' between the opposite upstanding arm portions 14 and 14' of a Y-shaped bracket 16. The arm portions 14 and 14' merge with generally horizontal arm portions 18 and 18', respectively, the latter arm portions being secured by any suitable means to a downwardly extending stem 20 of the bracket 16 (FIGS. 4 and 7). Two bosses 21 and 21' project downwardly from the undersurfaces of the arm portions 18 and 18', respectively, and have a purpose to be explained hereinbelow.

The bracket 16 is mounted upon the forward end of a balance beam 22 (FIGS. 2, 3 and 6), said balance beam being pivotally supported adjacent its forward end by means of two laterally extending pins 23 and 23' (FIG. 3) seated within two opposed bearing blocks 24 and 24', respectively. The bearing blocks are carried by a mounting base 25 (FIG. 2) having laterally extending flanges 26 and 26' secured to the frame A (FIG. 5). Each of the pins 23 and 23' is provided along its undersurface area adjacent its outer end with a knife edge, said knife edge being seated within a V-groove 27 (FIG. 6) located at the base of a U-shaped depression 28 extending laterally along the top surface of the respective block 24 or 24'. The balance beam is maintained in position by means of two alignment assemblies cooperatively associated with the bearing blocks 24 and 24', respectively. Each of the alignment assemblies comprises an angle plate 30 (FIG. 5) having a vertical leg bolted to the respective bearing block at 31, and a horizontal leg extending along the top surface of the bearing block. Two setscrews 32 and 33 are threaded through the vertical and horizontal legs, respectively, of each angle plate 30. The setscrews 32 and 33 are provided with lock nuts 34 and 35, respectively, whereby said screws may be retained in predetermined positions, with their inner ends spaced from the outwardly projecting end and the top surface, respectively, of the associated pin 23 or 23'. By adjustment of the positions of the setscrews 32 and 33, the balance beam is properly aligned with respect to the bearing blocks 24 and 24', and is retained against accidental removal from its seated position.

The balance beam 22 is bifurcated, as most clearly seen in FIG. 3, providing two branches 36 and 36'. The latter have enlarged forward end portions 37 and 37', respectively, and are there interconnected by a reinforcement web 38. The forward branch end portions 37 and 37' carry, adjacent their respective inner ends, the laterally extending knife-edge pins 23 and 23'. Adjacent their outer ends, the branch end portions 37 and 37' carry laterally extending pins 40 and 40', respectively. Each of these pins has a knife edge portion arranged to be inserted within a V-groove 42 in a bearing block 44 secured within a rectangular channel 45 extending transversely across the undersurface of the associated boss 21 or 21' of the bracket 16 (FIGS. 7 and 8).

In order to maintain the bracket 16 in position, an alignment and retainer assembly is cooperatively associated with each of the bearing blocks 44. Each of these alignment assemblies comprises an angle plate 47 (FIGS. 2 and 7) having a vertical leg 47a bolted to the associated boss 21 or 21' at 48 (FIG. 2), and a horizontal leg 47b extending beneath the respective pin 40 or 40'. Two setscrews 49 and 50 are threaded through the vertical and horizontal legs, respectively, of each angle plate 47. The set screws 59 and 50 are provided with lock nuts 51 and 52, respectively, whereby said screws may be retained in predetermined positions, with their inner ends spaced from the outwardly projecting end and the undersurface of the associated pin 40 or 40', respectively. By adjustment of the positions of the set screws 49 and 50, the bracket 16 is properly aligned with respect to the forward end portions 37 and 37' of the branches 36 and 36' of balance beam 22, and is retained against accidental removal from the pins 32.

The left-hand end of the balance beam 22, as viewed in FIGS. 2 and 3, is provided with a counterweight support block 54. The block 54 is formed with a diagonally extending slot 56 having a flat base and flat side walls extending perpendicular thereto. Within the slot 56 rests a pin 58 which has a center portion of square cross section adapted to tightly fit within the slot. An end portion of the pin, having an upwardly projecting knife edge, extends laterally outward from either side of the block 54. The block 54 is threadably connected to the beam 22 at 60, so that its position may be adjusted axially of the beam. A clevis 62, having an eye at the upper end of each of its legs 64 (only one being shown, FIG. 2) is mounted upon the knife edge end portions of the pin 58. A vertically extending rod 66 is supported by means of a hook 68 which at its upper end engages the clevis 62, said rod 66 being arranged to support a cup 70. The cup 70 is adapted to contain predetermined quantities of material such as lead pellets, which serve as a counterweight. The lower end of the rod 66, the lower end of the stem 20 of bracket 16, and the lower end of a vertically extending post 72 secured to the mounting base 25 are linked together by generally horizontally extending stabilizer bars 74 and 76. The connections to the bars are made by means of pivot pins 77, and undesirable swinging movement of the bracket 16 or of the counterweight cup 70 is thus prevented.

In order to limit and dampen the movement of the balance beam 22, the mounting base 25 supports two devices located to the left of the bearing blocks 24, 24', as viewed in FIG. 2. The first of these devices is a threaded stud 78 (FIG. 5) secured at its lower end to the mounting base 25, and extending upwardly through a suitable aperture 79 (FIG. 3) in a transverse web 80 extending between the branches 36 and 36' of the balance beam 22. Two stop nuts 81 and 82 are carried by the stud 78, said nuts being located above and below the web 80, respectively (FIG. 5). The nuts 81 and 82 will serve to stop movement of the web 80 upon contact therewith, and will thereby limit the pivotal movement of the beam. The second device is an oil-filled dash pot 86 of conventional design, which is seated on the mounting base, and which serves to dampen the movements of the balance beam in a well known manner.

Also seated on the mounting base 25 and bearing against the undersurface of the balance beam 22 is a spring 84 (FIG. 5), which creates a reciprocal stability factor in the operation of the weighing scale 10. Thus, when the cup 70 is filled with a counterweight material, the hopper H being empty, the beam 22 will pivot in a counterclockwise direction from the position of FIG. 2, and the spring 84 will become compressed, providing a torque value about the axis of rotation of the beam 22, said torque value being substantially equal in magnitude to the torque value of the filled cup 70, but opposite in direction thereto. When material is then introduced into the hopper H, the beam 22 will gradually pivot in a clockwise direction, and the degree of compression of the spring 84 will lessen correspondingly, until the beam reaches a horizontal position and the spring is no longer under compression, as shown in FIG. 2. The rate of the spring 84 determines the value of each graduation on the dial of the scale which will be described presently.

A device for indicating the weight of the material in the hopper H is mounted adjacent said hopper by means of a bracket 88 (FIG. 4) which extends laterally from the frame structure A. The weight indicator device 90 comprises a closed box-like housing 92 (FIG. 6) having a bottom wall 94, and two side walls 96 supporting a cross wall 98. The housing 92 is closed at its upper end by an arcuate dial in the form of a screen 100 of a light-transmissive material such as plastic or glass. Secured to the bottom wall 94 of the housing 92 is a bracket 101 which supports a socket 102 adapted to receive an electric light bulb 103.

The cross wall 98 is provided with a central rectangular aperture 104 through which a beam of light may pass from the bulb 103 for illuminating the screen 100. The center of the aperture 104 and the filament 106 of the bulb 103 lie along a central plane 108 of the indicator housing. The aperture is of such size that the bulb will illuminate the whole of the screen 100, as indicated by phantom lines 109 and 109a. The center plane 108 of the indicator housing passes through the axis of rotation of the balance beam 22.

In order to provide an indication of the weight of the material delivered to the hopper H, a curved shutter 110 is mounted for movement through the space between the bulb 103 and the aperture 104 in the cross wall 98 to vary the area of illumination of the screen 100. The shutter 110 at its lower end is attached by means of a collar 112 (FIG. 4) to the outer end 114a of an arm 114 which has an offset inner end portion 114b (FIG. 3) supported by and extending laterally from the end portions 37 and 37' of the balance beam 22. The collar 112 is provided with a setscrew 119 (FIG. 4) permitting the adjustment of the collar on the arm 114. The shutter 110 (FIG. 6) has, as its center of curvature, the axis of rotation of the balance beam 22, and is arranged to enter the indicator housing 92 through an aperture 120 in one of the end walls 96 thereof. At its inner end the shutter 110 is wedge-shaped, as shown at 122.

It will be clear that movement of the balance beam 22 will cause the shutter 110 to move in an arcuate path between the bulb 103 and the wall opening 104 to thereby shut off, to a greater or lesser extent, the light beams projected by the bulb 103 onto the screen 100. As shown in FIG. 4, the screen 100 is provided with suitable graduations, so that the area of illumination of the screen will indicate the weight of material within the hopper H. As mentioned previously, the rate of the spring 84 determines the value per graduation on the screen.

In operating the scale of the invention, the hopper H is first loaded with a calibration weight that is equal to the desired weight of material to be filled into each container placed on platform J. The cup 70 is then filled with a material, such as lead pellets, to counterbalance the weight of the filled hopper H and bring the balance beam 22 into substantially horizontal position. The position of the shutter 110 is then adjusted so that it will cast a shadow upon the lower half of the screen 100 when the bulb 103 is lit, as shown in FIG. 4. The hopper H is then emptied, and the balance beam 22 will as a result be drawn downward by the counterweight in the cup 70, thus causing the spring 84 to become compressed. The motor E is then switched on, and the conveyor B set into operation. Articles from the storage bin G are delivered to the hopper H by the conveyor B, and the forward end of the balance beam will begin to pivot in a clockwise direction, since the compression spring 84 tends to aid such pivoting. When exactly the desired weight of articles has been delivered to the hopper, the balance beam will have been brought into a substantially horizontal position, and the spring 84 will then serve a dampening purpose only.

Before any material has been delivered by the conveyor to hopper H, all of the screen 100 will be in shadow, since the shutter 110 will be in its position of furthest insertion into the indicator housing 92 due to the effect of the counterweight in the cup 70 upon the balance beam 22. As the hopper is gradually filled, an increasingly greater area of the screen 100 will become illuminated until, at the balance point, the line between the illuminated and shaded portions thereof will coincide with the zero calibration line of the scale, as shown in FIG. 4. The position of the shutter 110 will then be approximately that shown in FIG. 6. Any further filling of the hopper will further increase the area of illumination of the screen.

If desired, means may be provided for automatically terminating the delivery of material to the hopper when the desired weight has been reached. For this purpose, a switch 124 (FIGS. 3 and 5) for turning off the motor E is carried by the mounting base 25. A suitable switch-actuating member 126 in the form of a vertically extending bolt is mounted on the balance beam 22, being adapted to open the switch 124 when the beam reaches a horizontal position, at which time the desired weight of material has been filled into the hopper H.

When the hopper H has been filled with the predetermined weight of material, it is pivoted in a clockwise direction, as viewed in FIG. 1, about pins 12 and 12' to discharge its contents into the container on platform J. The means for maintaining the hopper in position for receiving material from the conveyor B, and for pivoting the hopper when filled are fully described in the aforementioned Belk application, and will therefore not be described here.

While I have described a particular embodiment of the present invention, it will be understood that various changes and modifications may be made without departing from the spirit of the present invention and the scope of the appended claims.

Having thus described my invention what I claim as new and desire to to protect by Letters Patent is:

1. An apparatus for discharging measured amounts of material into a receptacle comprising a support, a conveyor mounted in said support having a discharge end, powered means for motivating said conveyor, a balance beam having a counterweight end portion and an opposite loading end portion, means on said support pivotally mounting said beam intermediate its end portions, means mounting said receptacle on the loading end portion of said beam under the discharge end of said conveyor, control means borne by said support and connected to said powered means, and actuating means on said beam engageable with said control means when said beam is in balance for interrupting motivation of said conveyor.

2. A weighing scale comprising a balnce beam mounted for pivotal movement about an axis; and a weight indicating device including a housing having opposite ends and being mounted in a fixed position with respect to said beam, a curved light-transmissive screen at one end of said housing, a light bulb in the opposite end of said housing from said screen, said light bulb having a light emitter element positioned at the center of curvature of said screen, a shutter connected to said balance beam, and a wall in said housing between said screen and said bulb, said wall providing an aperture having a centerline passing through said center of curvature and the center of the screen, said aperture admitting light from said source and directing it onto said screen, said shutter having an edge in said housing movable in an arcuate path concentric with said beam axis and between said light bulb and said aperture, movement of said shutter edge being in proportion to movement of said balance beam for varying the area of the screen which is illuminated by light from said emitter element, the illuminated area of said screen thereby also varying in proportion to movement of said beam.

3. In a weighing apparatus including a support, an elongated balancing member mounted on said support for pivotal movement about a substantially horizontal axis; a weight indicator comprising a concavo-convex, light transmissive dial mounted in said support and having a center of curvature, a source of light having a point of light concentration, means mounting said source in said support with its point of concentration substantially at said center of curvature, means borne by said support substantially enclosing said source and directing light in an angular beam diverging outwardly from said point of concentration onto said dial, and light intercepting means connected to said balancing member in spaced relation to said axis and providing an edge movable in an arcuate path between said source and said dial and substantially equidistantly radially spaced from said axis during pivoting movement of said balancing member, movement of said edge along its path being substantially proportional to pivoting movement of said balancing member so that the area of said dial which is illuminated by said beam of light is substantially proportional to the pivoting movement of the said balancing member.

4. In a filling apparatus including a frame, a balance beam having opposite front loading and rear counterweight end portions and being supported in said frame intermediate said end portions for pivotal movement about a substantially horizontal axis, and a hopper supported on said front end portion of said beam for pivotal movement about an axis substantially parallel to the beam axis whereby material in the hopper is weighed by said beam and subsequently discharged from said hopper upon pivotal movement thereof; a device for indicating movements of said beam during weighing of said material comprising a housing mounted on said frame above the front end portion of said beam and laterally adjacent to said hopper, said housing including an upper light-transmissive wall and a front wall downwardly extending from said upper wall and providing a slot extending substantially parallel to the beam axis, a source of light mounted in said housing, a cross wall supported in said housing between said light source and the said upper wall and including an aperture for directing light from said source onto said upper wall, an arm connected to said front end portion of said beam and having an outer end portion projecting outwardly from said beam below said housing and substantially parallel to said beam axis, and a shutter connected to said outer end portion of said arm and slidably fitted through said slot for movement between said aperture and said source during pivoting movement of said beam to cause the amount of light from said source which strikes said upper wall to change in proportion to the pivoting movement of said beam.

5. In a weighing scale, a support, a balance beam, means mounting said beam on said support for pivoting movement about an axis located intermediate opposite ends of said beam, means carried by said beam for supporting a load to be weighed, said supporting means being located between said axis and one end of said beam being adapted to pivot said beam in one direction, counterweight means carried by said beam and located between said axis and the end of said beam opposite to said one end thereof, said counter-weight means being adapted to pivot said beam in a direction opposite to said one direction, a compression spring seated on said support and engaging said beam, said spring being located intermediate said axis and said opposite end of the beam, said spring being in a non-compressed condition when said beam is in balance and being held in a compressed condition by said counterweight means when the load is insufficient to balance said beam, and means operable without imposing frictional drag on the pivotal movement of said beam and being responsive to the pivotal movement of said beam for indicating the weight of the load being weighed.

6. In a weighing apparatus, a balance beam mounted for pivotal movement about an axis, a housing having a light transmissive dial, means within said housing for illuminating said dial, and a shutter connected to said beam and extending into said housing for movement between said illuminating means and said dial during pivotal movement of said beam for varying the area of illumination of said dial whereby the degree of movement of said beam during a weighing operation is indicated by the area of said dial which is illuminated.

7. In a weighing apparatus, a balance beam mounted for pivotal movement, a housing having a dial with a light transmissive surface, means within said housing for illuminating said surface, means within said housing between said illuminating means and said dial for directing rays of light from said illuminating means onto said surface, means mounting said housing adjacent to said beam, said housing having an opening, and a shutter connected to said beam adjacent to said housing and in alignment with said opening in the housing for movement into said housing between said illuminating means and said directing means during pivotal movement of said beam for varying the area of illumination of said surface whereby the degree of movement of said beam during a weighing operation is indicated by the area of said surface which is illuminated.

8. A weighing scale comprising a balance beam pivotally mounted intermediate its ends, a receptacle for material to be weighed mounted on said balance beam adjacent one end thereof and adapted to pivot said balance beam in one direction, a counterbalance weight mounted on said balance beam adjacent the other end thereof and adapted to pivot said balance beam in a direction opposite to said one direction, a compression spring connected to said balance beam and arranged to become compressed upon pivoting of said balance beam in said opposite direction, a housing having a dial with a light-transmissive surface, means in said housing for illuminating said surface, a wall in said housing between said illuminating means and said dial and providing an aperture for directing light from said illuminating means onto said dial, means mounting said housing in vertically spaced relation to said one end of said beam, said housing providing a slot extending transversely of said beam, and a shutter connected to said one end of said beam and slidably received in said slot for movement between said illuminating means and said aperture for varying the area of illumination of said surface in accordance with movements of said beam.

9. A weighing scale comprising a balance beam mounted for pivotal movement about an axis, a housing having a dial with a light-transmissive surface, means within said housing for illuminating said surface, a wall in said housing between said illuminating means and said dial and having an aperture for directing rays of light from said illuminating means onto said surface, means mounting said housing in vertically spaced relation to said beam, said housing having a slot extending transversely of said beam and a shutter connected to said balance beam adjacent to said housing and slidably fitted in said slot for movement between said aperture and said illuminating means during pivotal movement of said beam for varying the area of illumination of said surface, whereby the degree of movement of said balance beam during a weighing operation will be indicated by the area of said surface which is illuminated.

References Cited in the file of this patent

UNITED STATES PATENTS

| | | |
|---|---|---|
| 73,273 | Willoughby | Jan. 17, 1868 |
| 606,529 | Finn | June 28, 1898 |
| 830,682 | Soderquist et al. | Sept. 11, 1906 |
| 1,600,155 | Wetzel | Sept. 14, 1926 |
| 1,706,966 | Reeves | Mar. 26, 1929 |
| 1,712,767 | Johnson | May 14, 1929 |
| 1,719,734 | Smith | July 2, 1929 |
| 1,904,542 | Schaper | Apr. 18, 1932 |
| 1,916,993 | Schumaker | July 4, 1933 |
| 1,949,721 | Klopsteg | Mar. 6, 1934 |
| 2,013,922 | Markham | Sept. 10, 1935 |
| 2,090,288 | Eschenbacher et al. | Aug. 17, 1937 |
| 2,273,591 | Powell | Feb. 17, 1942 |
| 2,552,319 | Hess | May 8, 1951 |
| 2,723,165 | Hess | Nov. 8, 1955 |
| 2,805,834 | Terry | Sept. 10, 1957 |